United States Patent [19]

Kuroda et al.

[11] Patent Number: 4,970,012

[45] Date of Patent: Nov. 13, 1990

[54] POLYMERIC SOLID ELECTROLYTES AND PRODUCTION PROCESS THEREOF

[75] Inventors: Nobuyuki Kuroda; Hiroshi Kobayashi, both of Yokohama; Kazuo Matsuura, Tokyo, all of Japan

[73] Assignee: Nippon Oil Company, Ltd., Tokyo, Japan

[21] Appl. No.: 444,947

[22] Filed: Dec. 4, 1989

[30] Foreign Application Priority Data

Dec. 16, 1988 [JP] Japan ................................ 63-317843

[51] Int. Cl.$^5$ .............................................. H01M 6/18
[52] U.S. Cl. .............................. 252/62.2; 252/182.27; 429/192
[58] Field of Search ......................... 252/62.2, 182.27; 429/192

[56] References Cited

U.S. PATENT DOCUMENTS 4,654,279 3/1987 Bauer et al. ........................ 429/192

4,798,773 1/1989 Yasukawa et al. ................. 252/62.2

FOREIGN PATENT DOCUMENTS 2118763 11/1983 United Kingdom ................ 429/192

*Primary Examiner*—Stephen J. Kalafut
*Attorney, Agent, or Firm*—Oblon, Spivak, McClelland, Maier & Neustadt

[57] ABSTRACT

Polymeric solid electrolytes are formed by the present invention, namely, by incorporating a low molecular weight polyethylene glycol, a high molecular weight polyethylene oxide and an alkali metal or ammonium salt in a specific cinnamate ester compound, followed by a polymerization and crosslinking. The polymeric solid electrolytes have high ionic conductivity, high strength as a film, and good adhesion with electrodes. Therefore, they can be applied widely as ionics materials, e.g., for the total solidification of lithium batteries and plastic batteries and high capacity condensers and as electrolytes for electrochromic displays.

19 Claims, No Drawings

POLYMERIC SOLID ELECTROLYTES AND PRODUCTION PROCESS THEREOF

BACKGROUND OF THE INVENTION (1) Field of the Invention:

This invention relates to ion-conductive polymers, in other words, to polymeric solid electrolytes and a process for the production thereof.

(2) Description of the Related Art:

Organic polymeric solid electrolytes have been developed in recent years, which compared to inorganic solid electrolytes, have such advantages that (1) they have formability and can be easily formed into thin films of a large area and (2) they have flexibility and hence excellent adhesion with electrodes.

Mixtures of polyethylene oxide and alkali metal salts were proposed as polymeric solid electrolytes by M. B. Armand et al. ["Fast Ion Transport in Solids", 131 (1979)]. The solid electrolytes however had an electrical conductivity as low as $10^{-6}$ S/cm or less at room temperature. Moreover, they exhibited low strength when formed into a thin film, and their adhesion with electrodes was not satisfactory. There has accordingly been a desire for the improvements of these properties.

With a view toward improving their film strength, it has been proposed inter alia to induce crosslinking by the reaction between a trifunctional polyethylene glycol and a diisocyanate derivative (Japanese Patent Laid-Open No. 48716/1987) or by the polymerization reaction of polyethylene glycol diacrylate (Japanese Patent Laid-Open No. 285954/1987). Further improvements have however been desired with respect to the balancing among film strength, ionic conductivity, adhesion with electrodes and so on.

SUMMARY OF THE INVENTION

An object of the present invention is provide a polymeric solid electrolyte which has an ionic conductivity of at least $10^{-5}$ S/cm at room temperature, high film strength even at a thickness of 100 μm or smaller and good adhesion with electrodes.

In one aspect of this invention, there is thus provided a polymeric solid electrolyte comprising:

(i) crosslinked molecules of a radiation-cured substance of a cinnamate ester compound represented by the following formula (I):

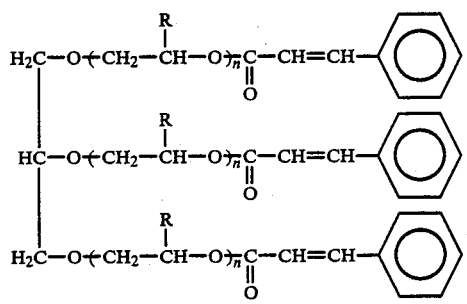

wherein R represents a hydrogen atom or an alkyl group having 1-5 carbon atoms and n stands for an integer of 3-40; and (ii) (a) a low molecular weight polyethylene glycol methyl-etherified at both terminals thereof;

(b) a high molecular weight polyethylene oxide; and (c) an alkali metal or ammonium salt, said polyethylene glycol (a), polyethylene oxide (b) and salt (c) being contained in said crosslinked molecules of said radiation-cured substance.

DETAILED DESCRIPTION OF THE INVENTION

The present invention will hereinafter be described in detail.

The crosslinked molecules forming the polymeric solid electrolyte according to this invention are obtained by crosslinking the cinnamate ester compound represented by the formula (I).

In the cinnamate ester compound represented by the formula (I), the length of each oxyalkylene chain governs the opening size of the crosslinking network of the resulting substance. Both unduly large lengths and unduly small lengths can hardly bring about advantageous effects of the present invention. It is preferred for each oxyalkylene chain to contain 3–40 oxyalkylene units, with 5–30 oxyalkylene units being more preferred. As the kind of such oxyalkylene units, oxyethylene units, oxypropylene units and mixtures of both oxyethylene and oxypropylene units can be mentioned as preferred examples.

The low molecular weight polyethylene glycol useful as component (a) in this invention has been methyle-therified at both terminals thereof. To provide a higher ionic conductivity, the molecular weight may preferably be in a range of 100–3,000 with a range of 200–2,000 being more preferred.

The polyethylene oxide used as component (b) in this invention may preferably have a molecular weight as high as feasible in order to improve the film-forming properties of the polymeric solid electrolyte. The desired molecular weight is 100,000 or more, for example, 100,000–3,000,000, with 200,000–2,000,000 being particularly preferred.

Illustrative of the alkali metal salt employed as component (c) in this invention include alkali metal perchlorates such as lithium perchlorate, sodium perchlorate and potassium perchlorate, alkali metal tetrafluoroborates such as lithium tetrafluoroborate, sodium tetrafluoroborate and potassium tetrafluoroborate, alkali metal hexafluorophosphates such as lithium hexafluorophosphate and potassium hexafluorophosphate, alkali metal trifluoroacetates such as lithium trifluoroacetate, alkali metal trifluoromethanesulfonates such as lithium trifluoromethanesulfonate, etc.

Exemplary ammonium salts also usable as component (c) include quaternary ammonium salts of perchlorates such as tetraisopropyl ammonium perchlorate and tetra-n-butyl ammonium perchlorate, quaternary ammonium tetrafluoroborates and hexafluorophosphates such as tetra-n-butyl ammonium tetrafluoroborate and tetra-n-butyl ammonium hexafluorophosphate, and quaternary ammonium trifluoromethanesulfonates such as tetra-n-butyl ammonium trifluoromethanesulfonate.

The polymeric solid electrolyte according to this invention can be obtained, for example, by subjecting the cinnamate ester represented by the formula (I) to radiation curing in the presence of (a) the low molecular weight polyethylene glycol, (b) the high molecular weight polyethylene oxide and (c) the alkali metal or ammonium salt, thereby forming crosslinked molecules.

Here, the weight ratio of the low molecular weight polyethylene glycol (a) to the high molecular weight polyethylene oxide (b) can preferably be in a range of 1:0.1–1:10.

To provide good balancing between film-forming properties and ionic conductivity, the compound of the formula (I) can be used in a proportion of 10–200 parts by weight, more preferably 20–100 parts by weight per 100 parts by weight of the sum of the low molecular weight polyethylene glycol (a) and high molecular weight polyethylene oxide (b).

To assure a high ionic conductivity, the alkali metal or ammonium salt (c) can be used in a proportion of 1–30 parts by weight, more preferably 3–20 parts by weight per 100 parts by weight of the sum of the low molecular weight polyethylene glycol (a), high molecular weight polyethylene oxide (b) and the compound represented by the formula (I).

For the objects of this invention, it is also preferred to add, for example, a copolymer of methoxypolyethylene glycol monomethacrylate and methyl methacrylate and/or a copolymer of methoxypolyethylene glycol monomethacrylate and acrylonitrile.

No particular limitation is imposed on the manner for the production of the polymeric solid electrolyte according to this invention. For instance, the production may be conducted in the following manner, details of which will be described subsequently in examples.

Prescribed amounts of the cinnamate ester compound represented by the formula (I), the low molecular weight polyethylene glycol (a), the high molecular weight polyethylene oxide (b), the alkali metal or ammonium salt (c) and a sensitizer are dissolved in a solvent such as acetonitrile, acetone, ethanol or tetrahydrofuran, thereby preparing a homogeneous solution. The solution is then cast on a substrate and after substantial removal of the solvent, is exposed to ultraviolet rays to cure the resultant film.

Illustrative of the sensitizer employed in the above production include p-nitrodiphenyl, p-nitroaniline, 2,4-dinitroaniline, picramide, 2-chloro-4-nitroaniline, 2,6-dinitro-4-nitroaniline, benzophenone, dibenzalacetone, benzyl, p,p'-dimethylaminobenzophenone, p,p'-tetramethyldiaminobenzophenone (Michler's ketone), 1,2-benzoanthraquinone, 1,9-benzoanthrone, 3-methyl-1,3-diaza-1,9-benzanthrone, 2-nitrofluorene, 2,5-dinitrofluorene, 5-nitroacenaphthene, etc.

Polymeric solid electrolytes according to this invention have a high ionic conductivity, high film strength and good adhesion to electrodes. Therefore, they can be applied widely as ionics materials, e.g., for the total solidification of lithium batteries and plastic batteries and high capacity condensers and as electrolytes for electrochromic displays.

Further, the polymeric solid electrolytes of this invention can each be formed quickly into films by exposure to ultraviolet rays. Therefore, this process is extremely advantageous compared to conventional processes.

The present invention will hereinafter be described specifically by the following examples. It should however be borne in mind that this invention is not limited to or by the following examples.

SYNTHESIS EXAMPLE 1:

A three-necked 300-ml flask was charged with 30 g ($3 \times 10^{-2}$ mole) of a trifunctional polyethylene glycol having a molecular weight of about 1,000 ("PEO-TRIOL 1000", trade name; product of Dai-ichi Kogyo Seiyaku Co., Ltd.; hereinafter abbreviated as "3PEG"), 200 ml of anhydrous toluene and 20 ml of pyridine. Under stirring at room temperature, a solution of 25 g ($1.5 \times 10^{-1}$ mole) of cinnamic chloride in toluene was added dropwise over 30 minutes. After completion of the dropwise addition, they were reacted at 80° C. for 7 hours to synthesize a cinnamate ester compound. The reaction mixture was cooled and then filtered. The filtrate was passed through an alumina/activated carbon column, whereby the cinnamate ester compound was purified. Identification of the cinnamate ester compound was conducted by the following $^1$H-NMR and IR analyses.

Analysis of $^1$H-NMR spectrum:

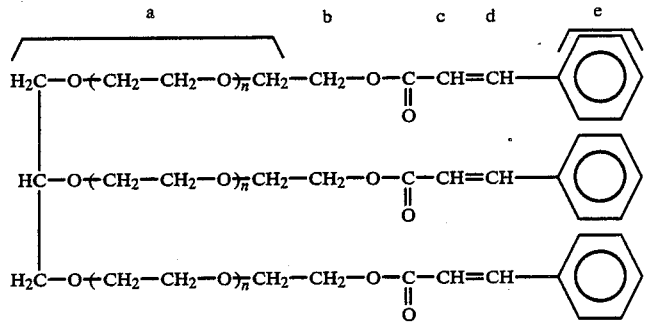

Solvent, $CDCl_3$ and internal standard, TMS:

| | |
|---|---|
| 3.5–3.8 ppm | a |
| 4.15 ppm | b |
| 6.48 ppm | c |
| 7.71 ppm | d |
| 7.25–7.45 ppm | e |

Analysis of IR spectrum:

| | |
|---|---|
| 1715 cm$^{-1}$: | —O—C—‖O |
| 1635 cm$^{-1}$: | —CH=CH— |
| 1000–1200 cm$^{-1}$: | —C—O—C— |
| n = 7 | |

SYNTHESIS EXAMPLE 2:

Another cinnamate ester (n=21) was synthesized in a similar manner to Synthesis Example 1 except that as PEG, one having a molecular weight of about 3,000 ("PEOTRIOL 3000", trade name; product of Dai-ichi Kogyo Seiyaku Co., Ltd.) was used.

EXAMPLE 1

Dissolved in 30 ml of acetonitrile were 3 g of the cinnamate ester compound obtained in Synthesis Example 1, 3 g of polyethylene oxide (molecular weight: about 500,000) and 6 g of polyethylene glycol dimethyl ether (molecular weight: about 400), followed by the addition of 782 mg of LiClO$_4$, 55 mg of benzophenone and 11 mg of Michler's ketone. They were thoroughly stirred into a homogeneous solution. This liquid composition was cast on a Teflon(trade name)-coated petri dish and then exposed for 2 minutes to ultraviolet rays from a high-pressure mercury vapor lamp, thereby obtaining a cured film. An IR analysis indicated the disappearance of the peak at 1635 cm$^{-1}$, so that the curing was found to proceed fully. After drying the cured film at 80° C. for 48 hours under reduced pressure, its ionic conductivity $\sigma$ was measured by the complex impedance method. The measurement gave $\sigma = 5.3 \times 10^{-5}$ S/cm (25° C.). The film had good adhesion with electrodes.

EXAMPLE 2

Dissolved in 30 ml of acetonitrile were 2 g of the cinnamate ester compound obtained in Synthesis Example 1, 1 g of polyethylene oxide (molecular weight: about 500,000), 5 g of polyethylene glycol dimethyl ether (molecular weight: about 400) and 2 g of a 1:2 copolymer of methoxy polyethylene glycol monomethacrylate (molecular weight: about 570) and methyl methacrylate, followed by the addition of 870 mg of LiClO$_4$, 55 mg of benzophenone and 11 mg of Michler's ketone. They were thoroughly stirred into a homogeneous solution. The procedure of Example 1 was then followed to obtain a cured film. Measurement of its ionic conductivity gave $\sigma = 1.3 \times 10^{-4}$ S/cm (25° C.). The film was flexible and had good adhesion with electrodes.

EXAMPLE 3

Dissolved in 30 ml of acetonitrile were 2 g of the cinnamate ester compound obtained in Synthesis Example 2, 2 g of polyethylene oxide (molecular weight: about 500,000), 5 g of polyethylene glycol dimethyl ether (molecular weight: about 400) and 2 g of a 1:2 copolymer of methoxy polyethylene glycol monomethacrylate (molecular weight: about 570) and methyl methacrylate, followed by the addition of 957 mg of LiClO$_4$, 80 mg of benzophenone and 16 mg of Michler's ketone. They were thoroughly stirred into a homogeneous solution. The procedure of Example 1 was then followed to obtain a cured film. Measurement of its ionic conductivity gave $\sigma = 1.4 \times 10^{-4}$ S/cm (25° C.). The film was flexible and had good adhesion with electrodes.

COMPARATIVE EXAMPLE 1

A solid electrolyte film was produced in a similar manner to Example 1 except for the omission of the polyethylene glycol dimethyl ether (molecular weight: about 400). Its ionic conductivity was very low, namely, $5.8 \times 10^{-7}$ S/cm (25° C.).

COMPARATIVE EXAMPLE 2

A solid electrolyte film was produced in a similar manner to Example 1 except for the omission of the polyethylene oxide (molecular weight: about 500,000). Its ionic conductivity was $6.3 \times 10^{-5}$ S/cm (25° C.) and hence was high. However, it had weak film strength and thus had no practical utility.

We claim:

1. A polymeric solid electrolyte comprising:
   (i) crosslinked molecules of a radiation-cured substance of a cinnamate ester compound represented by the following formula (I):

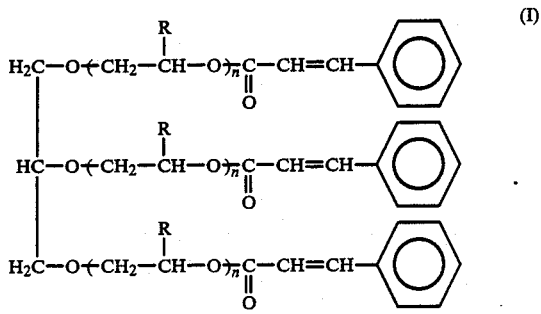

wherein R represents a hydrogen atom or an alkyl group having 1–5 carbon atoms and n stands for an integer of 3–40; and
   (ii) (a) a low molecular weight polyethylene glycol methyl-etherified at both terminals thereof;
   (b) a high molecular weight polyethylene oxide; and
   (c) an alkali metal or ammonium salt, said polyethylene glycol (a), polyethylene oxide (b) and salt (c) being contained in said crosslinked molecules of said radiation-cured substance.

2. The polymeric solid electrolyte of claim 1, wherein each ester moiety in the cinnamate ester compound represented by the formula (I) contains 5–30 oxyalkylene units (n = 5–30).

3. The polymeric solid electrolyte of claim 2, wherein the oxyalkylene units are oxyethylene units or oxypropylene units or a mixture of both oxyethylene and oxypropylene units.

4. The polymeric solid electrolyte of claim 1, wherein the molecular weight of the polyethylene glycol (a) is in a range of 100–3,000.

5. The polymeric solid electrolyte of claim 4, wherein the molecular weight of the polyethylene glycol (a) is in a range of 200–2,000.

6. The polymeric solid electrolyte of claim 1, wherein the molecular weight of the polyethylene oxide (b) is at least 100,000.

7. The polymeric solid electrolyte of claim 6, wherein the molecular weight of the polyethylene oxide (b) is in a range of 100,000–3,000,000.

8. The polymeric solid electrolyte of claim 7, wherein the molecular weight of the polyethylene oxide (b) is in a range of 200,000–2,000,000.

9. The polymeric solid electrolyte of claim 1, wherein the alkali metal salt (c) is selected from the group consisting of alkali metal perchlorates such as lithium perchlorate, sodium perchlorate and potassium perchlorate, alkali metal tetrafluoroborates such as lithium tetrafluoroborate, sodium tetrafluoroborate and potassium tetrafluoroborate, alkali metal hexafluorophosphates such as lithium hexafluorophosphate and potassium hexafluorophosphate, alkali metal trifluoroacetates such as lithium trifluoroacetate, and alkali metal trifluoromethanesulfonates such as lithium trifluoromethanesulfonate.

10. The polymeric solid electrolyte of claim 1, wherein the ammonium salt (c) is selected from the group consisting of quaternary ammonium salts of perchlorates such as tetraisopropyl ammonium perchlorate and tetra-n-butyl ammonium perchlorate, quaternary ammonium tetrafluoroborates and hexafluorophosphates such as tetra-n-butyl ammonium tetrafluoroborate and tetra-n-butyl ammonium hexafluorophosphate, and quaternary ammonium trifluoromethanesulfonates such as tetra-n-butyl ammonium trifluoromethanesulfonate.

11. The polymeric solid electrolyte of claim 1, further comprising a copolymer of methoxypolyethylene glycol monomethacrylate and methyl methacrylate or a copolymer of methoxypolyethylene glycol monomethacrylate and acrylonitrile.

12. A process for the production of a polymeric solid electrolyte, which comprises:
(i) reacting a trifunctional polyethylene glycol with cinnamic chloride to obtain a compound represented by the following formula (I):

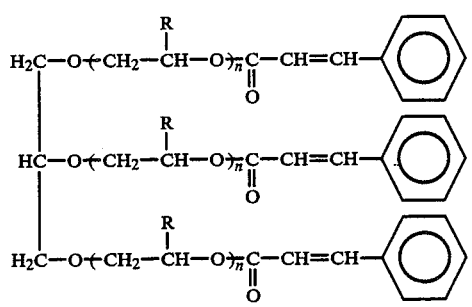

wherein R represents a hydrogen atom or an alkyl group having 1-5 carbon atoms and n stands for an integer of 3-40; and
(ii) causing the compound to undergo a crosslinking reaction in the presence of:
(a) a low molecular weight polyethylene glycol methyl-etherified at both terminals thereof;
(b) a high molecular weight polyethylene oxide; and
(c) an alkali metal or ammonium salt.

13. The process of claim 12, wherein the crosslinking reaction is catalyzed by exposure to a radiation.

14. The process of claim 12, wherein the weight ratio of the polyethylene glycol (a) to the polyethylene oxide (b) is in a range of 1:0.1–1:10.

15. The process of claim 12, wherein the compound of the formula (I) is used in a proportion of 10–200 parts by weight per 100 parts by weight of the sum of the polyethylene glycol (a) and polyethylene oxide (b).

16. The process of claim 15, wherein the compound (I) is used in a proportion of 20–100 parts by weight per 100 parts by weight of the sum of the polyethylene glycol (a) and polyethylene oxide (b).

17. The process of claim 12, wherein the alkali metal or ammonium salt (c) is used in a proportion of 1–30 parts by weight per 100 parts by weight of the sum of the polyethylene glycol (a), polyethylene oxide (b) and compound (I).

18. The process of claim 17, wherein the alkali metal or ammonium salt (c) is used in a proportion of 3–20 parts by weight per 100 parts by weight of the sum of the polyethylene glycol (a), polyethylene oxide (b) and compound (I).

19. The process of claim 12, wherein the crosslinking reaction is carried out in the presence of a copolymer of methoxypolyethylene glycol monomethacrylate and methyl methacrylate or a copolymer of methoxypolyethylene glycol monomethacrylate and acrylonitrile.

* * * * *